US010754415B2

(12) United States Patent
Ozawa

(10) Patent No.: US 10,754,415 B2
(45) Date of Patent: Aug. 25, 2020

(54) CONTROL APPARATUS THAT CONTROLS MEMORY AND CONTROL METHOD THEREOF

(71) Applicant: CANON KABUSHIKI KAISHA, Tokyo (JP)

(72) Inventor: Manabu Ozawa, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 259 days.

(21) Appl. No.: 15/416,333

(22) Filed: Jan. 26, 2017

(65) Prior Publication Data

US 2017/0220094 A1  Aug. 3, 2017

(30) Foreign Application Priority Data

Feb. 3, 2016  (JP) .................................. 2016-019033

(51) Int. Cl.
*G06F 1/3206* (2019.01)
*G06F 1/3234* (2019.01)

(52) U.S. Cl.
CPC .......... *G06F 1/3275* (2013.01); *G06F 1/3206* (2013.01); *G06F 1/3243* (2013.01); *Y02D 10/13* (2018.01); *Y02D 10/14* (2018.01); *Y02D 10/152* (2018.01)

(58) Field of Classification Search
None
See application file for complete search history.

(56) References Cited

U.S. PATENT DOCUMENTS

| 5,586,307 | A | * | 12/1996 | Wong | ........................ | G06F 1/10 |
| | | | | | | 713/400 |
| 6,108,099 | A | * | 8/2000 | Ohtani | .................... | G06F 3/121 |
| | | | | | | 358/1.14 |
| 6,721,774 | B1 | * | 4/2004 | Lee | ........................ | G06F 7/5338 |
| | | | | | | 708/629 |
| 8,503,264 | B1 | * | 8/2013 | Narayanan | ............... | G11C 5/14 |
| | | | | | | 365/226 |

(Continued)

FOREIGN PATENT DOCUMENTS

CN  102792380  11/2012
CN  103678191  3/2014
(Continued)

OTHER PUBLICATIONS

Office Action dated Jun. 22, 2020 in counterpart Chinese Application No. 201710063701.3, together with English translation thereof.

*Primary Examiner* — Paul Yen
(74) *Attorney, Agent, or Firm* — Venable LLP

(57) ABSTRACT

With a method of connecting SRAMs by daisy chain connection, the power state of all the SRAMs is determined uniquely. Because of this, even in the case of an SRAM of a function module in which SRAM access does not occur, the SRAM returns to the normal mode. The control apparatus includes a plurality of function modules including a memory capable of making a transition between a first power state and a second power state that is more power-saving than the first power state in accordance with a control signal. Then, control is performed so as to output a first signal that gives instructions to make a transition of the power state based on the control signal to a memory of a function module of the plurality of function modules in which processing using a function that the function module has is performed.

11 Claims, 11 Drawing Sheets

(56) References Cited

U.S. PATENT DOCUMENTS

| | | | |
|---|---|---|---|
| 8,824,235 B2 | 9/2014 | Balluchi et al. | 365/227 |
| 9,007,638 B2 | 4/2015 | Yamakawa | 358/1.15 |
| 9,147,441 B2 | 9/2015 | Fujioka | G11C 8/12 |
| 9,577,611 B2 | 2/2017 | Balluchi et al. | G11C 11/4072 |
| 9,952,550 B2 | 4/2018 | Choho | G06F 3/1285 |
| 10,209,664 B2 | 2/2019 | Choho | 15/80 |
| 2004/0057280 A1* | 3/2004 | Ooishi | G11C 11/15 |
| | | | 365/170 |
| 2008/0024596 A1* | 1/2008 | Li | H04N 5/2257 |
| | | | 348/47 |
| 2009/0125640 A1* | 5/2009 | Sunwoo | G06F 3/017 |
| | | | 710/3 |
| 2010/0185883 A1* | 7/2010 | Hamilton | G06F 1/3203 |
| | | | 713/320 |
| 2012/0314522 A1 | 12/2012 | Balluchi et al. | 365/227 |
| 2013/0021832 A1* | 1/2013 | Yamaki | G11C 5/148 |
| | | | 365/51 |
| 2014/0063526 A1 | 3/2014 | Yamakawa | 358/1.13 |
| 2014/0084965 A1* | 3/2014 | Ahn | H03K 17/30 |
| | | | 327/109 |
| 2014/0085960 A1 | 3/2014 | Fujioka | 365/63 |
| 2014/0181558 A1* | 6/2014 | Taha | G06F 1/3206 |
| | | | 713/323 |
| 2014/0340135 A1 | 11/2014 | Balluchi et al. | 327/199 |
| 2015/0023101 A1* | 1/2015 | Tanaka | G11C 16/30 |
| | | | 365/185.11 |
| 2015/0186763 A1 | 7/2015 | Yamakawa | 358/1.14 |
| 2015/0269977 A1 | 9/2015 | Ishizu et al. | 365/154 |
| 2016/0011558 A1 | 1/2016 | Choho | 399/88 |
| 2018/0224795 A1 | 8/2018 | Choho | G03G 15/80 |

FOREIGN PATENT DOCUMENTS

| | | |
|---|---|---|
| CN | 103685817 | 3/2014 |
| CN | 105262921 | 1/2016 |
| JP | 2007-164822 A | 6/2007 |

\* cited by examiner

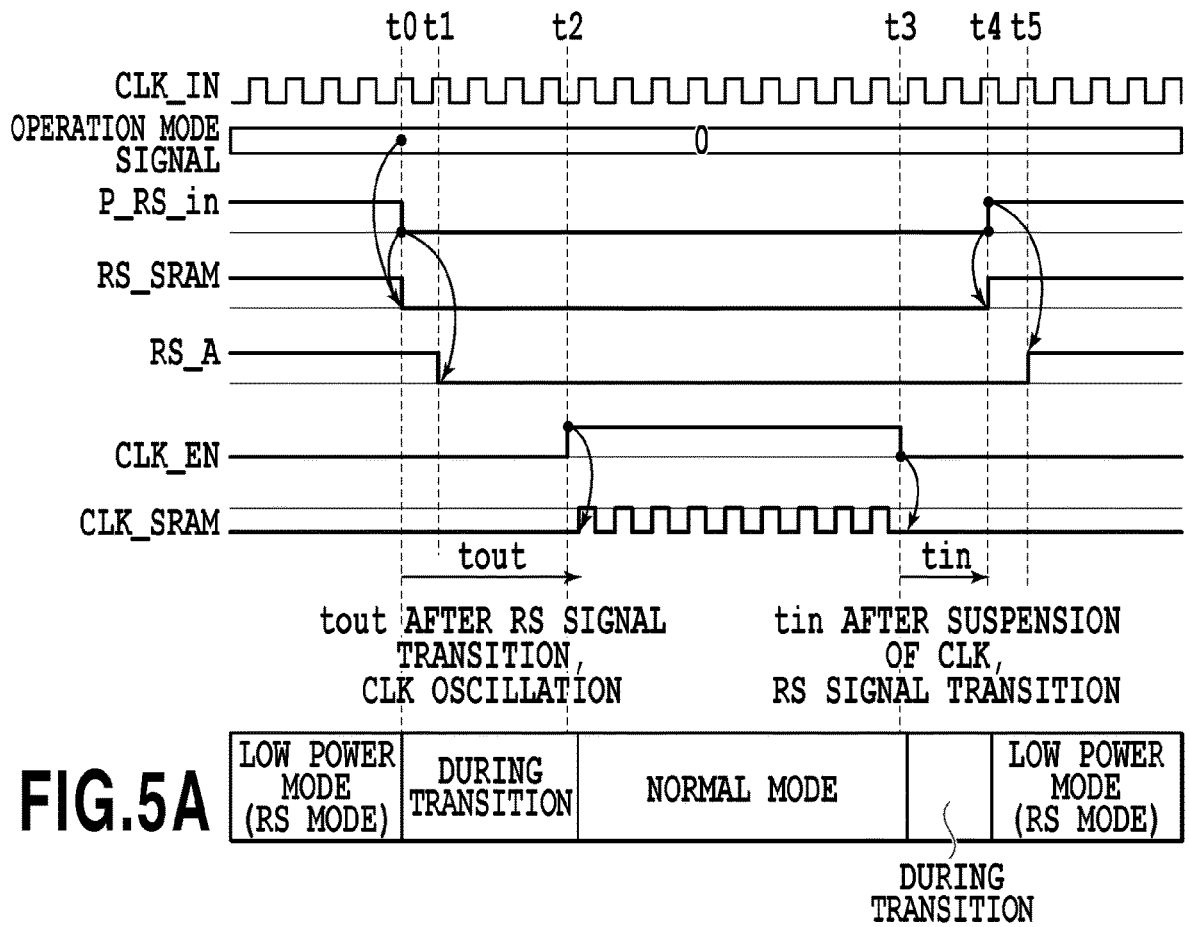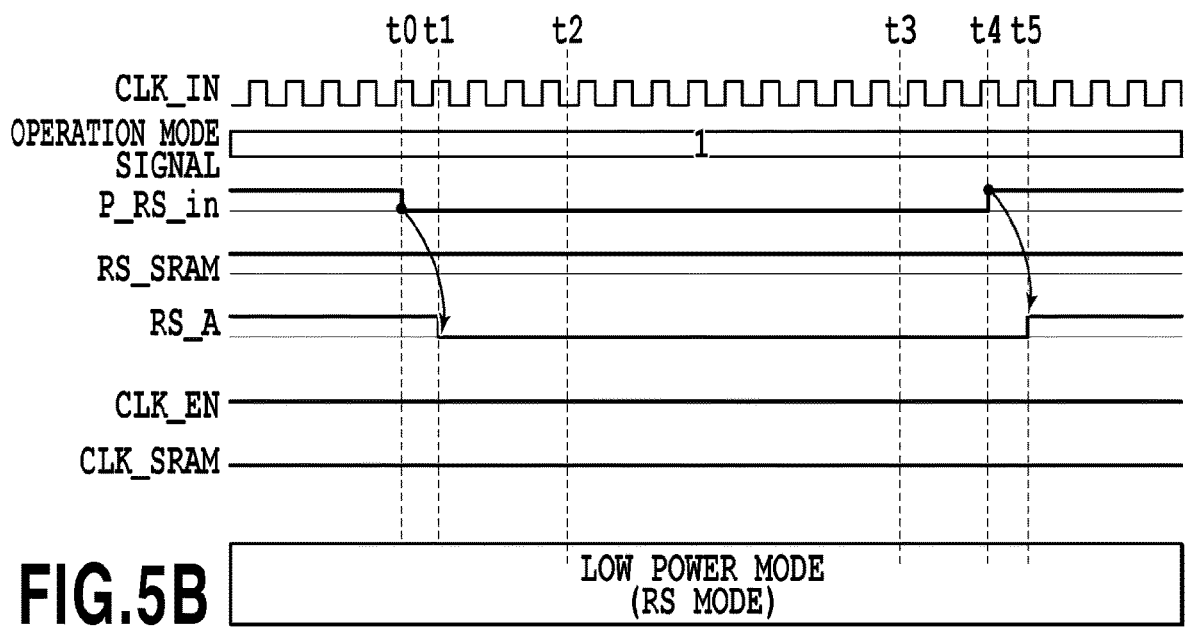

US 10,754,415 B2

CONTROL APPARATUS THAT CONTROLS MEMORY AND CONTROL METHOD THEREOF

BACKGROUND OF THE INVENTION

Field of the Invention

The present invention relates to a power-saving control technique of a memory capable of making a transition from a first power state into a second power state where power consumption is smaller than that in the first power state in accordance with a control signal.

Description of the Related Art

There is a memory module capable of setting a low power consumption mode and returning from a low power consumption mode in accordance with a control signal (Japanese Patent Laid-Open No. 2007-164822). This memory module has an input node to input a control signal called a resume standby signal (hereinafter, RS signal) and makes a transition into a resume state (low power consumption state) or into a standby state in accordance with the RS signal.

Further, in Japanese Patent Laid-Open No. 2007-164822, a technique is described which delays a control signal that is input to a memory module in a subsequent stage by a delay circuit provided between two memory modules by connecting a plurality of memory modules in a daisy chain. Due to this, occurrence of a rush current is mitigated at the time of the plurality of memory modules returning from the low power consumption mode.

In the case where a plurality of memory modules is connected in a daisy chain as in the technique described in Japanese Patent Laid-Open No. 2007-164822, all of the plurality of memory modules make a transition into the low power consumption mode or return from the low power consumption mode. However, in an apparatus including a plurality of function modules having a memory, there is a case where all of the function modules are not used. For example, in the case where an MFP (Multifunction Peripheral) is supposed, there is a possibility that the image processing module that is used is different between a color scan and a monochrome scan. For example, in the case where a color scan is performed, a specific function module is used, but in the case where a monochrome scan is performed, there is a possibility that the specific function module is not used. To the memory of the function module that is determined to be not used in the operation mode, access is not made as a matter of course. In order to perform more power-saving image processing, it is desirable to maintain the memory of a function module to which access is not made in the state of the low power consumption mode.

With the technique described in Japanese Patent Laid-Open No. 2007-164822, the power state of all the memory modules is determined uniquely. Because of this, even the memory of an image processing module to which access is not made at the time of execution of a job returns to a normal mode. Consequently, it is not possible to maintain the memory of a module that is not used for processing in the low power consumption mode.

SUMMARY OF THE INVENTION

The control apparatus according to the present invention is a control apparatus including a plurality of function modules including a memory capable of making a transition between a first power state and a second power state that is more power-saving than the first power state in accordance with a control signal, and includes a control unit configured to perform control so as to output a first signal that gives instructions to make a transition of the power state based on the control unit to a memory of a function module of the plurality of function modules in which processing using a function that the function module has is performed.

Further features of the present invention will become apparent from the following description of exemplary embodiments (with reference to the attached drawings).

BRIEF DESCRIPTION OF THE DRAWINGS

FIG. 5A and FIG. 5B are each a timing chart showing control of an RS mode of an SRAM of the first embodiment;

DESCRIPTION OF THE EMBODIMENTS

First Embodiment

In the following, embodiments for embodying the present invention are explained with reference to the drawings. In the following, power-saving control of a memory is explained by taking an MFR (digital multifunction peripheral) having a plurality of functions, such as a scan function, a print function, and a copy function, as an example. Further, in the following, explanation is given by taking an SRAM as an example of a memory for which power-saving control is performed. In the case of representing the power state of a memory, a first power state is called a normal mode and a second power state that is more power-saving than the first power state is called a low power mode. The low power mode is also called an RS mode (resume standby mode). The RS mode is a mode in which power saving is implemented by shutting off power to peripheral circuits except for the memory cell array in the memory module. Details of these will be described later.

Figure 1:
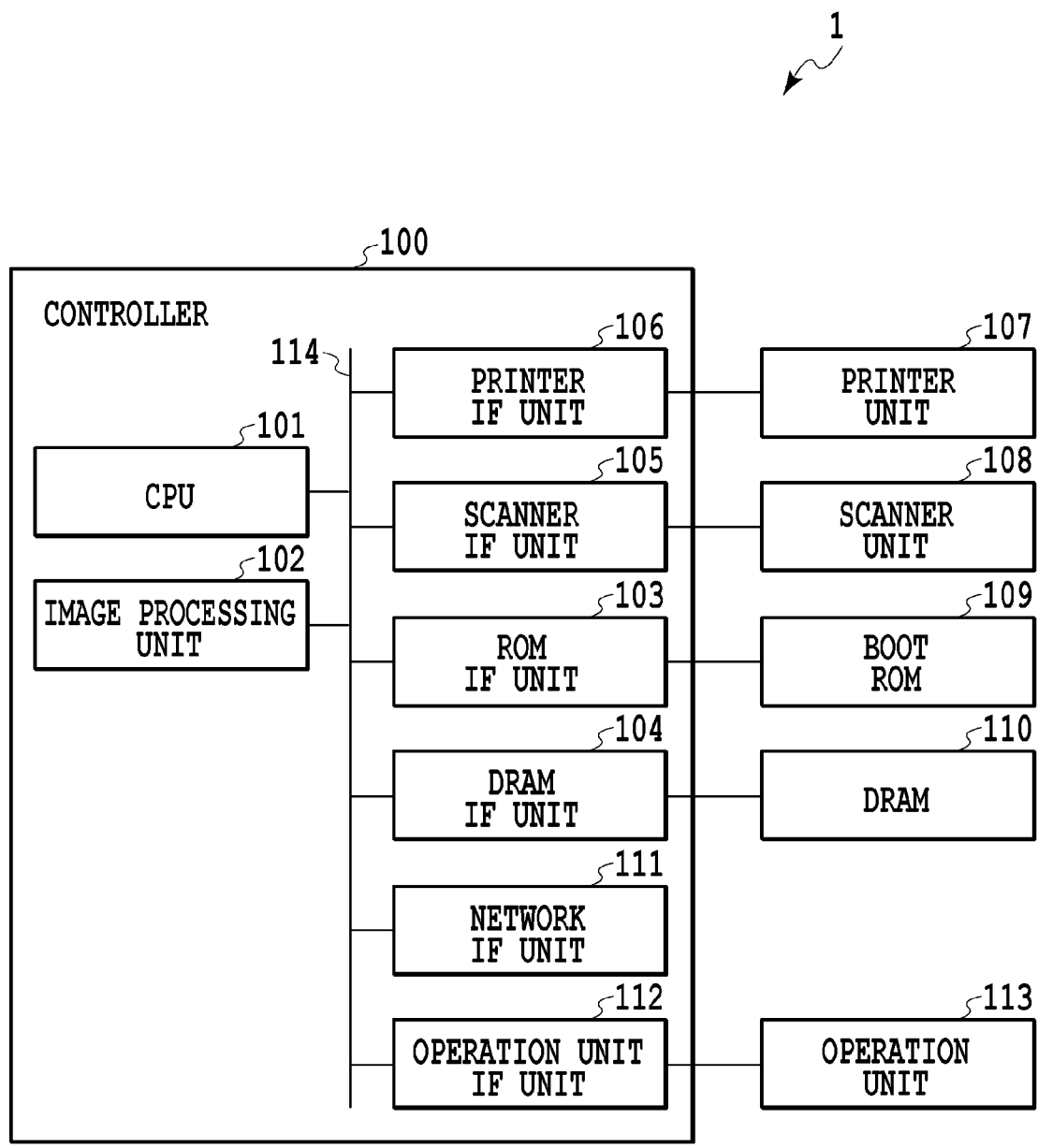
FIG. 1 is a block diagram of an entire MFP in a first embodiment.

FIG. 1 is a block diagram showing a configuration of an MFP 1 of the present embodiment. The MFP 1 has a controller 100, a printer unit 107, a scanner unit 108, a boot ROM 109, a DRAM 110, and an operation unit 113. The controller 100 has a CPU 101, an image processing unit 102, a ROM IF unit 103, a DRAM IF unit 104, a scanner IF unit 105, a printer IF unit 106, a network IF unit 111, and an operation unit IF unit 112.

The scanner unit 108, which is an image input device, and the printer unit 107, which is an image output unit, are connected to the controller 100 via the scanner IF unit 105 and the printer IF unit 106, respectively. By controlling these units, read of image data and a print output are implemented. Within the controller 100, each component is connected via a BUS 114.

The CPU 101 performs setting of the image processing unit 102, control of image data that is input from the scanner unit 108 and image data that is output to the printer unit 107, etc. The CPU 101 executes an OS and an application program developed onto the DRAM 110.

The image processing unit 102 is a circuit that performs various kinds of image processing. The image processing unit 102 is set and controlled by the CPU 101 and performs various kinds of image processing. Further, the image processing unit 102 has a configuration including a plurality of image processing modules. Details of the configuration will be described later. As an example of image processing, various kinds of image processing of image data are performed, such as rotation, enlargement/reduction, color processing, trimming/masking, binary conversion, multivalued conversion, and blank paper determination of image data. As print image processing, image processing correction or the like in accordance with the printer unit 107 is performed for image data that is printed and output. As scanned image processing, various kinds of processing are performed for image data that is read by the scanner unit 108, such as correction, processing, and editing.

The ROM IF unit 103 is an I/F module for accessing the boot ROM 109. At the time of the turning on of the power source of the controller 100, the CPU 101 accesses the boot ROM 109 via the ROM IF unit 103 and the CPU 101 boots.

The DRAM IF unit 104 is an I/F module for accessing the DRAM 110. The DRAM IF unit 104 includes a register for performing setting and control of the DRAM 110 and the register can be accessed by the CPU 101.

The operation unit IF unit 112 receives operation instructions and controls a display of operation results. The operation instructions are input by a user operating the operation unit 113. The network IF unit 111 is implemented by, for example, a LAN card or the like and connects to a network, such as a LAN, not shown schematically, and inputs and outputs device information and image data to and from an external device.

Figure 2:
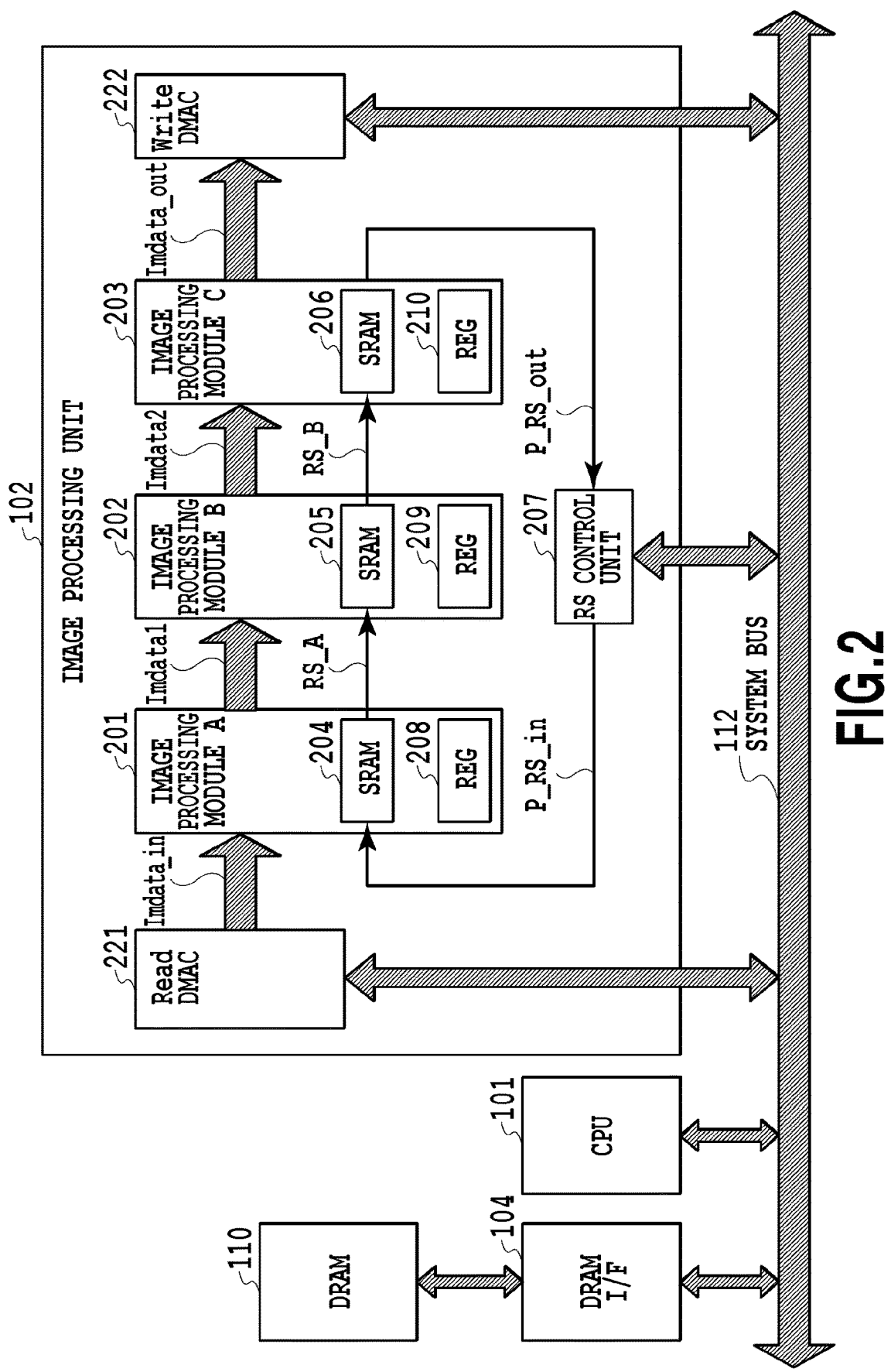
FIG. 2 is a block diagram showing an internal configuration of an image processing unit of the first embodiment.

FIG. 2 is a block diagram showing an internal configuration of the image processing unit 102. By using FIG. 2, a configuration to control a transition into the low power mode (RS mode) and a return to the normal mode of the SRAM in the first embodiment is explained. In the present embodiment, unless particularly specified otherwise, the low power mode and the normal mode of the SRAM are together called an "SRAM state mode". That is, the SRAM state mode includes the low power mode and the normal mode and in the present embodiment, the SRAM operates in one of these mode states. That is, the SRAM can make a transition between the low power mode and the normal mode.

The image processing unit 102 has an image processing module A 201, an image processing module B 202, and an image processing module C 203 making up an image processing pipeline. Further, the image processing unit 102 has a Read DMAC 221 that reads an image held in the DRAM 110 via the DRAM IF unit 104. Furthermore, the image processing unit 102 has a Write DMAC 222 that writes results of the processing by the image processing unit 102 to the DRAM 110 via the DRAM IF unit 104. Still furthermore, the image processing unit 102 has an RS control unit 207 configured to control the power state of the SRAM included in each image processing module. In the present embodiment, explanation is given by taking the configuration in which the image processing unit has three image processing modules as an example, but the configuration is not limited to this example, and the number of image processing modules may be smaller or larger.

The image processing module A 201 shown in FIG. 2 has an SRAM 204 and a REG 208. The SRAM 204 internally holds a table of image processing coefficients used for image processing and is used as a temporary image buffer. The REG 208 holds the operation modes of image processing and various setting values. Similarly, the image processing module B 202 has a configuration including an SRAM 205 and a REG 209 and the image processing module C 203 has a configuration including an SRAM 206 and a REG 210. In the example shown in FIG. 2, all the image processing modules included in the image processing unit 102 hold the SRAM, but it is needless to say that the present embodiment can be embodied in the case where one or more image processing modules hold the SRAM. Further, the configuration in which the image processing module holds one SRAM is shown, but the number of SRAMs included in one image processing module does not need to be one and a configuration in which a plurality of SRAMs is included in one image processing module may be accepted.

The RS control unit 207 controls a P_RS_in signal and controls the power state of the SRAM 204 to which the P_RS_in signal is output. Further, the SRAM 204 delays a signal that is input as the P_RS_in signal by a certain amount and then outputs the signal as an RS_A signal. The RS_A signal is an input RS signal to the SRAM 205. Similar to the SRAM 204, the SRAM 205 also delays a signal that is input as the RS_A signal by a certain amount, and then outputs the signal as an RS_B signal. The RS_B signal is the input RS signal to the SRAM 206. Similar to the SRAM 204 and the SRAM 205, the SRAM 206 also delays a signal that is input as the RS_B signal by a certain amount, and then outputs the signal as a P_RS_out signal. The P_RS_out signal is input to the RS control unit 207.

The configuration is such that the peak of a rush current caused by a plurality of SRAMs activating at the same time is suppressed by the RS control unit and each SRAM connecting one RS signal in the form of a ring to produce a delay between the SRAMs as described above. That is, the configuration is such that the occurrence of the rush current is mitigated by forming a daisy chain.

Figure 3:
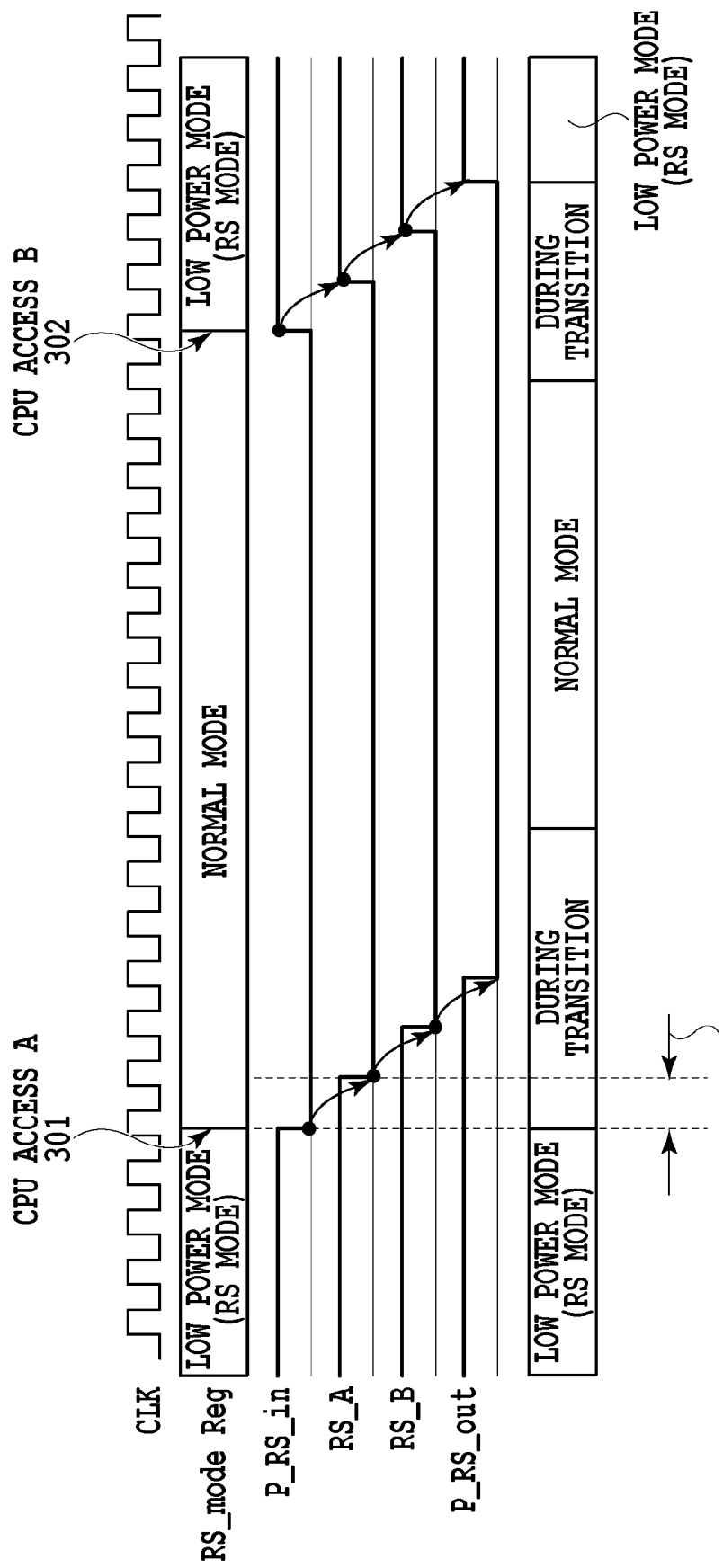
FIG. 3 is a timing chart of an RS signal in the image processing unit of the first embodiment.

Next, a control method of the RS signal in FIG. 2 is explained by using a timing chart shown in FIG. 3. In FIG. 3, an example of transition timing of the state mode of the SRAM of each image processing module included in the image processing unit 102 is shown. In the example shown in FIG. 3, the state mode of the SRAM is set to the low power mode (RS mode) in advance. Then, by the control of the CPU 101, the SRAM in the RS mode returns to the normal mode from the RS mode, and then makes a transition again into the RS mode.

In the present embodiment, explanation is given on the assumption that the period of time during which the RS signal is HIGH is the RS mode and the period of time during which the RS signal is LOW is the normal mode. However, it is needless to say that the explanation is also true with an SRAM in which the period of time during which the RS signal is LOW is the RS mode and the period of time during which the RS signal is HIGH is the normal mode.

First, a sequence to return the SRAM in the RS mode to the normal mode is explained. The CPU 101 accesses the RS control unit 207 via the BUS 114 at timing of CPU access A 301 shown on the timing chart. Then, the CPU 101 sets RS mode DISABLE (normal mode) to an RS_mode_Reg, which is an RS mode setting register, not shown schematically, included in the RS control unit 207. Then, the RS control unit 207 turns the P_RS_in signal to LOW indicating the normal mode and outputs the P_RS_in signal. The timing at which the CPU access A 301 occurs is timing at which software receives a job and the CPU determines to use the image processing unit 102 based on the contents of the job.

The P_RS_in signal output from the RS control unit 207 is input to the SRAM 204, and then delayed by a certain delay amount 303 and output as the RS_A signal and input to the SRAM 205. The reason a delay amount is necessary is to reduce the peak current of the rush current by dividing the size of the SRAMs that simultaneously make a transition into the normal mode into each block as small as possible as described previously. According to the size of each SRAM, the time necessary to make a transition into the normal mode changes, and therefore, the delay amount is designed in accordance with the time necessary for the state transition of each SRAM. It may also be possible to enable a user to arbitrarily set the delay amount. Further, it may also be possible to design a hardware configuration so as to obtain an appropriate delay amount based on the size of the SRAM.

The RS_A signal input to the SRAM 205 is delayed by a certain amount, and then output as the RS_B signal and input to the SRAM 206. The RS_B signal that is input to the SRAM 206 is delayed by a certain amount, and then output as the P_RS_out signal and input to the RS control unit 207. The state transition of each SRAM in the case where the RS signal is input changes depending on the operation mode that is set to each individual image processing module. This will be explained later in detail.

At the lower part in FIG. 3, the state mode of all the SRAMs is shown. In FIG. 3, an example is shown in which at the time of returning to the normal mode from the RS mode, even in the case where the RS signal is output as the P_RS_out signal, during a fixed period of time, the state is the state during transition and after the fixed period of time elapses, the transition is made into the normal mode. This is because a period of time during which the oscillation of the clock signal inside the memory is adjusted is provided in order to lessen the influence exerted by the clock signal on the power source voltage inside the memory module. Further, the fixed period of time before the P_RS_in signal turns to HIGH, the transition is made from the normal mode into the state during transition. The reason is the same, i.e., that a period of time during which the oscillation of the clock signal inside the memory is adjusted is provided in order to lessen the influence exerted by the clock signal on the power source voltage inside the memory module.

Subsequently, a sequence to cause the SRAM in the normal mode to make a transition into the RS mode is explained. The CPU 101 accesses the RS control unit 207 via the BUS 114 at timing of CPU access B 302 shown on the timing chart and sets RS mode ENABLE (RS mode) to the RS_mode_Reg, which is the RS mode setting register, not shown schematically. The timing at which the CPU 101 sets RS mode ENABLE to the RS_mode_Reg is the time at which the software detects the completion of the job and the software determines that the use of the image processing unit 102 is completed. At the timing of the CPU access B 302, the state is where the processing to suspend the clock signal inside the memory described previously has already been performed.

In the case where the CPU 101 sets RS mode ENABLE to the RS_mode_Reg, the RS control unit 207 outputs the P_RS_in signal indicating the RS mode. The P_RS_in signal output from the RS control unit 207 is input to the SRAM 204, and then delayed by a certain amount and output as the RS_A signal and input to the SRAM 205. The RS_A signal input to the SRAM 205 is delayed by a certain amount, and then output as the RS_B signal and input to the SRAM 206. The RS_B signal that is input to the SRAM 206 is delayed by a certain amount, and then output as the P_RS_out signal and input to the RS control unit 207. In this case also, depending on the operation mode that is set to each individual piece of image processing module, the state transition of the operation mode of the SRAM of each image processing module occurs. The internal operation of each individual piece of image processing module will be explained later in detail by using FIGS. 5A and 5B.

Figure 4:
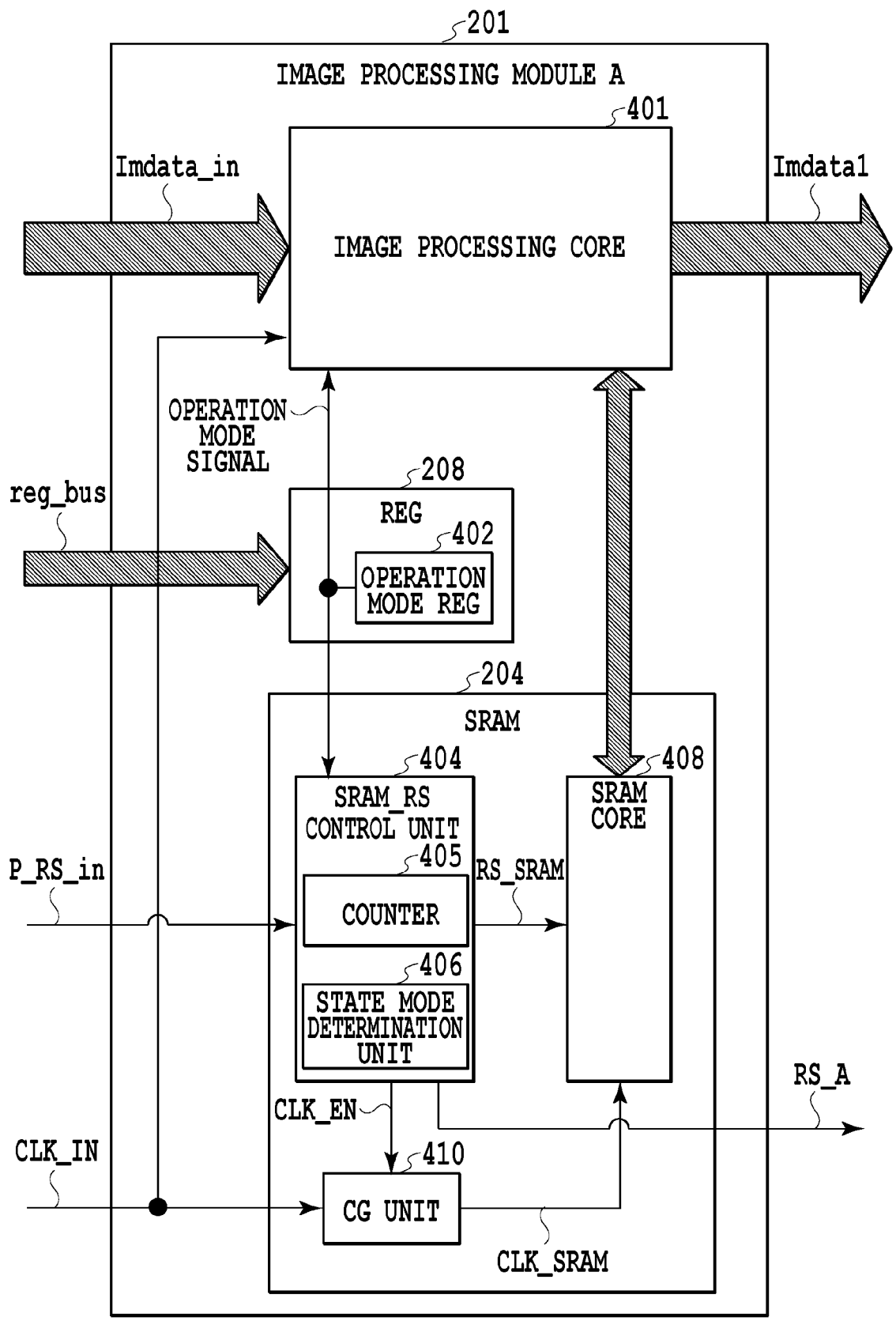
FIG. 4 is a block diagram showing an internal configuration of an image processing module of the first embodiment.

Next, by using the image processing module A 201 making up the image processing unit 102 as an example, the internal configuration of the image processing module is explained by using FIG. 4. The image processing module A 201 has a configuration including an image processing core 401, the SRAM 204, and the REG 208. The SRAM 204 and the REG 208 are those as explained already.

The image processing core 401 is a module that performs certain image processing for image data that is input and outputs the image data for which the image processing has been performed. It is possible for the image processing core 401 to select an operation mode, in which an input image is output as an output image as it is without performing image processing, based on the operation mode setting of the image processing that is set to an operation mode REG 402 included in the REG 208. In the present embodiment, it is assumed that the mode, in which an input image is output as an output image as it is, is called a "through mode". The setting value that is set to the operation mode REG 402 is transmitted to the image processing core 401 and the SRAM 204 by an operation mode signal. That is, it can be said that the operation mode signal is a signal indicating whether or not the mode is the through mode.

The SRAM 204 has an SRAM_RS control unit 404, an SRAM core 408, and a CG (clock gating) unit 410.

The SRAM_RS control unit 404 controls an RS_SRAM signal, which is the RS signal that controls the operation mode of the SRAM core 408. The SRAM_RS control unit 404 receives the input of the P_RS_in signal, which is the RS signal that controls the transition into the RS mode and the return to the normal mode explained by using FIG. 2, from the RS control unit 207. Further, the SRAM_RS control unit 404 receives the input of the operation mode signal. That is, the SRAM_RS control unit 404 functions as an input unit configured to input the P_RS_in signal and the operation mode signal. The SRAM_RS control unit 404 performs the control of the clock signal to the SRAM core 408, the control of the RS_SRAM signal, which is the RS signal that is supplied to the SRAM core 408, and the output control of the RS_A signal based on the P_RS_in signal and the operation mode signal whose input has been received. That is, the SRAM_RS control unit 404 functions as an output unit configured to control the output of these signals. The SRAM_RS control unit 404 includes a counter 405 and a state mode determination unit 406.

The counter 405 has a counter circuit inside thereof. In the case of controlling the RS mode of the SRAM upon receipt of the P_RS_in signal and the operation mode signal, the counter 405 times and controls the output timing of a CLK_EN signal that controls the oscillation and suspension of the clock signal by an internal counter circuit. Further, the counter 405 times and controls the timing at which the P_RS_in signal received by the SRAM_RS control unit 404 is output to a module in a subsequent stage as the RS_A signal by an internal counter circuit. Furthermore, it may also be possible for the counter 405 to include a count setting register, not shown schematically here, and to receive the P_RS_in signal and the operation mode signal that are input to make it possible to variably adjust the timing until the CLK_EN signal is output. It may also be possible to make it possible for the counter 405 to variably adjust the timing from the input of the P_RS_in signal until the RS_A signal is output.

Upon receipt of the P_RS_in signal and the operation mode signal that are input to the SRAM_RS control unit 404, the state mode determination unit 406 determines whether or not to change the state mode of the SRAM. The state mode determination unit 406 switches the determinations in accordance with the operation mode signal at the timing at which the P_RS_in signal in FIG. 3 changes from HIGH to LOW, i.e., at the timing at which the SRAM makes a transition into the normal mode from the RS mode. Specifically, the state mode determination unit 406 determines to cause the SRAM core 408 not to return to the normal mode from the RS mode in the case where the operation mode signal indicates the through mode at the timing at which the SRAM makes a transition into the normal mode from the RS mode. In the case of the through mode, the input image data becomes the output image data as it is, and therefore, access to the SRAM core 408 does not occur. Because of this, even in the case where the image processing unit 102 makes a transition into the normal mode, no problem will occur by leaving the operation mode of the SRAM core 408 in the RS mode, and it is possible to reduce power consumption compared to the case where a transition is made into the normal mode. Here, whether or not the mode is the through mode is taken as a reference of the determination, but with the setting indicating the operation mode in which the SRAM access does not occur, it is possible to apply the present embodiment, not limited to the through mode.

The SRAM core 408 includes the following blocks, not shown schematically here. That is, the SRAM core 408 includes a memory cell array that holds data and a timing control circuit that controls the operation timing signal of the memory upon receipt of a memory control signal that is input. Further, the SRAM core 408 includes a word driver unit and a column driver unit configured to specify a memory cell that actually stores data from an address that is input. Furthermore, the SRAM core 408 includes a power control unit, not shown schematically. The power control unit has a power source control circuit that shuts off power to peripheral circuits except for the memory cell array held by the SRAM core 408 in the case where a transition is made into the RS mode upon receipt of the RS signal. In the present embodiment, in the case where the RS signal is input as HIGH, the power source control circuit shuts off power to the peripheral circuits inside the SRAM core 408. Due to this, the SRAM 204 is caused to make a transition into the RS state (resume standby state), which is a low power state. Further, in the case where the RS signal is input as LOW, the power source control circuit supplies power to the peripheral circuits of the SRAM core 408.

The CG unit 410 controls whether or not to supply a CLK_IN signal that is input to the SRAM core 408 on a CLK_SRAM signal based on the CLK_EN signal. In the case where the CLK_EN signal indicates DISABLE, the CG unit 410 suspends the CLK signal to the SRAM core 408 by not putting the CLK_IN signal that is input on the CLK_SRAM signal. On the other hand, in the case where the CLK_EN signal indicates ENABLE, the CG unit 410 puts the CLK_IN signal that is input on the CLK_SRAM signal and supplies the CLK signal to the SRAM core 408.

Next, timing at which the SRAM_RS control unit 404 controls the RS_SRAM signal based on the setting value of the operation mode REG 402 and controls whether or not to change the state mode of the SRAM core 408 in accordance with the input of the P_RS_in signal is explained by using FIGS. 5A and 5B.

FIG. 5A is a timing chart in the case where the operation mode of the image processing module is set to the operation mode in which the processing including the SRAM access is performed. FIG. 5A shows the way the state mode of the SRAM makes a transition into the normal mode by the RS signal that is input, and then the state mode makes a transition into the RS mode again. Details of each signal are already explained in FIG. 2 and FIG. 4, and therefore, explanation is omitted.

First, an RS mode transition sequence of the SRAM is explained. At a time t0, the operation performed at the timing of the CPU access A 301 explained by using FIG. 3 is performed. That is, the CPU 101 sets the RS_mode_Reg of the RS control unit 207 to DISABLE via the BUS 114. Due to this, the RS control unit 207 outputs a signal indicating the completion of the RS mode as the P_RS_in signal. Here, the RS signal in the case of not the RS mode is assumed to be LOW (0) and the RS signal in the case of the RS mode is assumed to be HIGH (1), but it is not needless to say that it is possible to perform the present embodiment without being limited to this.

In the case where the P_RS_in signal is input at the time t0, the state mode determination unit 406 refers to the value of the operation mode signal that is input at the same time and determines whether or not to cause the SRAM core 408 to return from the RS mode. In FIG. 5A, in the operation mode REG 402 of the image processing module A, setting is performed so that the image processing module A operates in the operation mode including the SRAM access. Consequently, as the operation mode signal, a LOW signal indicating the operation mode including the SRAM access is output. Because the LOW signal is input as the operation mode signal, the state mode determination unit 406 determines to cause the SRAM core 408 to make a transition into the normal mode from the RS mode. That is, the state mode determination unit 406 outputs the input P_RS_in signal (here, indicating LOW) as the RS_SRAM signal and brings the SRAM core 408 into the state of transition from the RS mode into the normal mode. The state of the SRAM shown at the lower part in FIG. 5A has made a transition into the state during transition.

At a time t1, the SRAM_RS control unit 404 outputs the P_RS_in signal input at the time t0 as the RS_A signal. The delay from the time t0 to the time t1 may be determined in advance at the time of design or may be counted by the counter 405. The reason the delay from the time t0 to the time t1 exists is that it is necessary to delay the arrival of the SR signal to the SRAM that is connected to the next stage by a necessary time in order to reduce the peak current due to the rush current as described previously.

At a time t2 after a tout time elapses from the time t0, the SRAM_RS control unit 404 outputs the CLK_EN signal indicating HIGH and sets the clock gating having been performed in the CG unit 410 to DISABLE. That is, the SRAM_RS control unit 404 releases the clock gating and starts supply of the CLK_IN signal (clock signal) that is input to the SRAM core 408. The reason the delay time from the time t0 to the time t2 is necessary is that there are restrictions that the operation of the control circuit need to be started after the power source becomes sufficiently stable in the case where the supply of power source to the SRAM is resumed by operating the RS signal. The delay time from the time t0 to the time t2 may be controlled by using the counter 405 as hardware, may be fixed timing determined in advance, or may be controlled so as to be output at arbitrary timing after satisfying the above-described restrictions. On the resumption of the supply of clock, the SRAM operates in the normal mode.

At a time t3, the SRAM_RS control unit 404 outputs the CLK_EN signal indicating LOW. Then, the SRAM_RS control unit 404 performs control to suspend supply of the CLK_IN (clock signal) that is input to the SRAM core 408 by setting the clock gating in the CG unit 410 to ENABLE. It may also be possible to control the timing to change the CLK_EN signal to LOW at the time t3 by calculating the time from the time t2 to the time t3, which is necessary to perform a job, by hardware or by software. In the case where the supply of clock is suspended, the SRAM makes a transition again into the state during transition.

At a time t4 after a tin time elapses from the time t3, the SRAM_RS control unit 404 outputs HIGH as the RS_S-RAM signal in response to that the RS signal that is input as the P_RS_in signal is HIGH indicating the start of the RS mode. By this RS_SRAM signal, the SRAM core 408 is caused to make a transition into the RS mode. Due to this, at the time of causing the SRAM core 408 to make a transition into the RS mode, the clock that is input to the SRAM204 is suspended, and therefore, fluctuations in the power source at the time of the transition into the RS mode is suppressed. Consequently, it is made possible to securely hold data. Here, the tin time varies depending on the storage holding capacity of the SRAM and the larger the capacity, the longer the time is lengthened. Further, although not shown in FIG. 5A and FIG. 5B, as explained in FIG. 3, at the time t4, in order to control the P_RS_in signal, the CPU 101 sets the RS_mode_Reg of the RS control unit 207 to RS mode ENABLE via the BUS 114.

At a time t5, the SRAM_RS control unit 404 outputs the P_RS_in signal input at the time t4 as the RS_A signal. It may also be possible to determine the delay from the time t5 to the time t4 in advance at the time of design or to count by the counter 405.

By performing the operation explained above, in the case where the operation mode of the image processing module is set to the operation mode to perform the processing including the SRAM access, the state mode of the SRAM makes a transition into the normal mode by the RS signal that is input. Then, after this, by the RS signal, it is made possible to set the state mode again to the RS mode.

Subsequently, the case where the operation mode of the SRAM keeps the RS mode irrespective of the RS signal that is input on a condition that the operation mode of the image processing module is set to the operation mode not to perform the SRAM access is explained in detail by using the timing chart shown in FIG. 5B.

In FIG. 5B, the timing from the time t0 to the time t5 is the same as that explained in FIG. 5A. In FIG. 5A and FIG. 5B, the difference between the operation in the case where the SRAM returns to the normal mode from the RS mode and the operation in the case where the SRAM keeps the RS mode without returning to the normal mode is shown.

At the time t0, the operation performed at the timing of the CPU access A 301 explained by using FIG. 3 is performed. That is, the CPU 101 sets the RS_mode_Reg of the RS control unit 207 to DISABLE via the BUS 114. Due to this, the RS control unit 207 outputs a signal indicating the completion of the RS mode as the P_RS_in signal.

In the case where the P_RS_in signal is input at the time t0, the state mode determination unit 406 refers to the value of the operation mode signal input at the same time and determines whether or not to cause the SRAM core 408 to return from the RS mode. In FIG. 5B, the operation mode REG 402 of the image processing module A is set so that the image processing module A operates in the operation mode not including the SRAM access, and as the operation mode signal, a HIGH signal indicating this is output. Because the HIGH signal is input as the operation mode signal, the state mode determination unit 406 determines to cause the SRAM core 408 not to make a transition into the normal mode from the RS mode. That is, the SRAM core 408 keeps the LOW signal that is output as the RS_SRAM signal without changing the LOW signal. Because of this, the state of the SRAM shown at the lower part in FIG. 5B is not changed from the RS mode.

At the time t1, the SRAM_RS control unit 404 outputs the P_RS_in signal input at the time t0 as the RS_A signal. By outputting the input P_RS_in signal as the RS_A signal as described above, even in the case where a transition is not made into the normal mode from the RS mode, in the SRAM in the subsequent stage, control to appropriately return to the normal mode is performed in accordance with the necessity.

At the time t2, the SRAM_RS control unit 404 continuously outputs the LOW signal to the CLK_EN because the state mode determination unit 406 has determined to cause the SRAM core 408 not to make a transition into the normal mode at the time t0. Due to this, the clock gating having been performed in the CG unit 410 is continued. That is, the supply of the CLK_IN signal (clock signal) that is input to the SRAM core 408 is not started. Of course, the state of the SRAM shown at the lower part in FIG. 5B is not changed from the RS mode.

At the time t3, the SRAM_RS control unit 404 continuously outputs the LOW signal as the CLK_EN signal and continues the clock gating having been performed in the CG unit 410. Of course, the state of the SRAM shown at the lower part in FIG. 5B is not changed from the RS mode.

At the time t4, the SRAM_RS control unit 404 receives the HIGH signal indicting the start of the RS mode as the P_RS_in signal. The SRAM core 408 has already entered the RS mode, and therefore, the RS_SRAM signal remains HIGH and does not change. The transition of the P_RS_in signal at the time t4 is made by the CPU 101 setting the RS_mode_Reg of the RS control unit 207 to RS mode ENABLE via the BUS 114.

At the time t5, the SRAM_RS control unit 404 outputs the P_RS_in signal input at the time t4 as the RS_A signal. The delay from the time t5 to the time t4 may be determined in advance at the time of design or may be counted by the counter 405.

By performing the operation explained above, it is made possible to keep the operation mode of the SRAM in the RS mode irrespective of the RS signal that is input in the case where the operation mode of the image processing module is set to the operation mode not including the SRAM access. Consequently, it is made possible to reduce unnecessary operation power. On the other hand, the RS signal that is input is sent to the SRAM in the subsequent stage both in the case of maintaining the RS mode and in the case of returning to the normal mode, and therefore, it is made possible to keep only the SRAM that does not need to return to the normal mode in the RS mode.

As explained above, by including the SRAM_RS control unit 404, it is made possible to control the transition into the RS mode of the SRAM in accordance with the operation mode of the image processing. Because of this, in the case where the operation mode of the image processing module is the operation mode without the SRAM access accompanied, it is made possible to keep the SRAM in the RS mode, and therefore, it is made possible to perform the processing without using unnecessary power.

Second Embodiment

In the first embodiment, the aspect is shown in which the delay control of the RS signal is performed by using the SRAM_RS control unit 404 included inside the image processing module. In a second embodiment, a case is explained where control to delay the RS signal is performed by other than the SRAM_RS control unit 404 included inside the image processing module.

Figure 6:
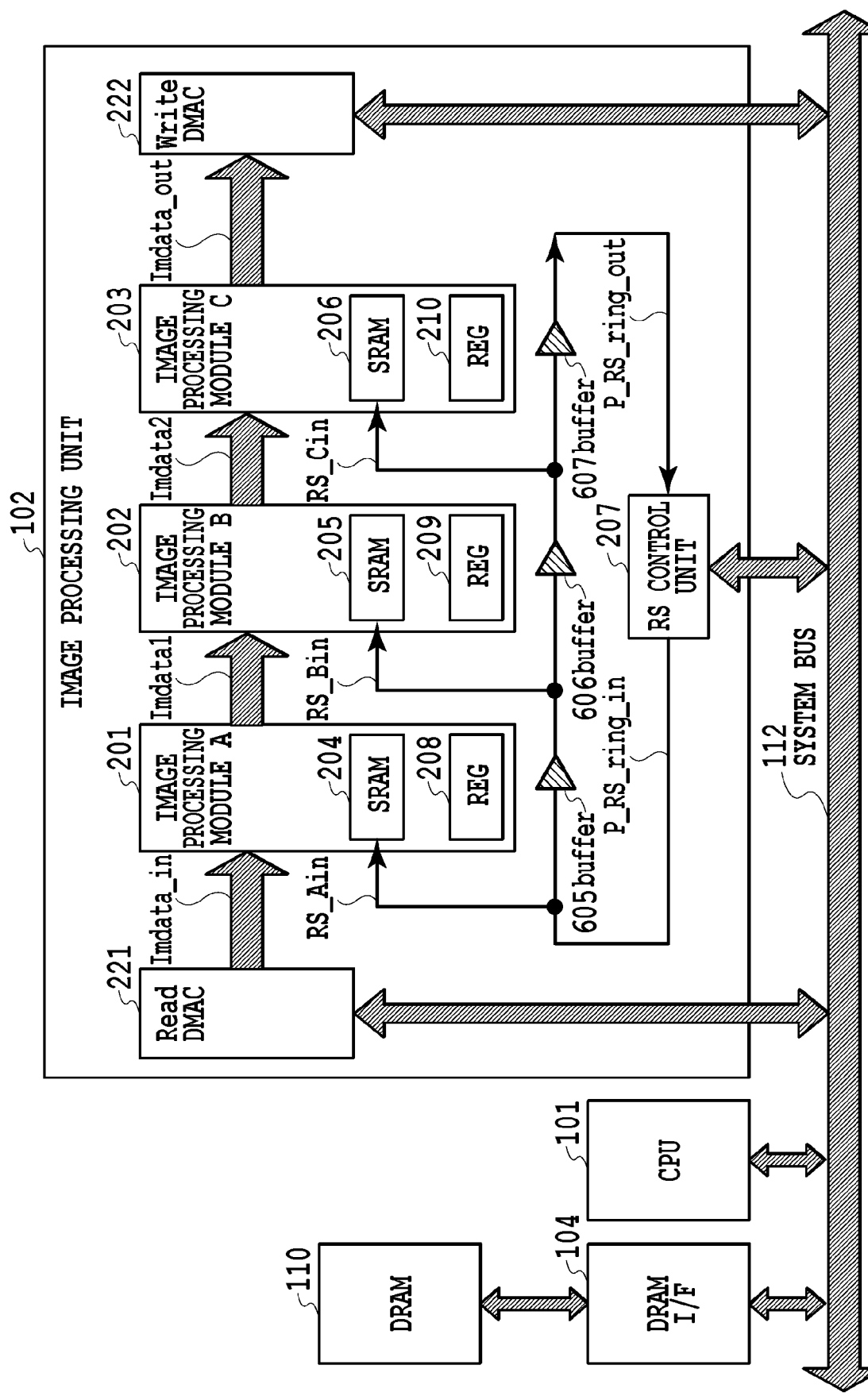
FIG. 6 is a block diagram showing an internal configuration of an image processing unit of a second embodiment.

FIG. 6 is a block diagram showing an internal configuration of the image processing unit 102 in the present embodiment. By using FIG. 6, a configuration is explained in which control is performed to make a transition into the low power mode (RS mode) and to return to the normal mode of the SRAM in the second embodiment.

In FIG. 6, the transmission path of the RS signal that is output from the RS control unit 207 is different from that in FIG. 2. In FIG. 6, that the RS signal is transmitted to each image processing module in accordance with the RS signal being output from the RS control unit 207 is the same as in FIG. 2. However, in the present embodiment, from the RS control unit 207, the RS signal is output as a P_RS_ring_in signal. Then, the delay of the signal is implemented by a buffer 605, a buffer 606, and a buffer 607 for generating a delay provided on the transmission path of the P_RS_ring_in signal. To the image processing module A 201, an RS_Ain signal obtained by dividing the P_RS_ring_in signal is input. To the image processing module B 202, an RS_Bin signal obtained by delaying the P_RS_ring_in signal by a certain amount by the buffer 605 is input. To the image processing module C 203, an RS_Cin signal obtained by further delaying the P_RS_ring_in signal by a certain amount by the buffer 606 is input. Then, a P_RS_ring_out signal obtained by further delaying the P_RS_ring_in signal by a certain amount by the buffer 607 is input to the RS control unit 207. The others are the same as the configurations explained in FIG. 2, and therefore, explanation is omitted.

Figure 7:
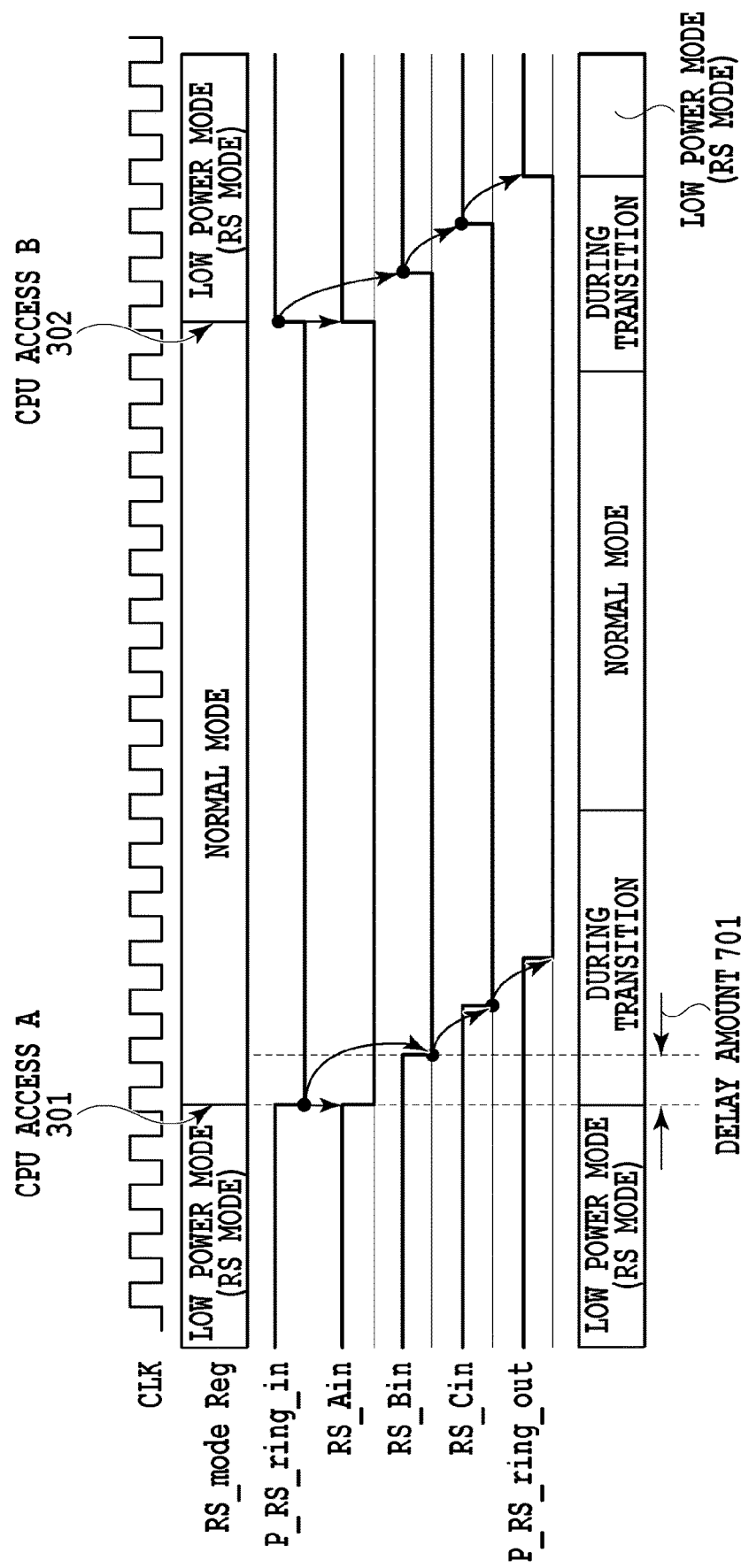
FIG. 7 is a timing chart of an RS signal in the image processing unit of the second embodiment.

FIG. 7 shows an example of transition timing of the state mode of the SRAM of each image processing module in the configuration shown in FIG. 6. In the example shown in FIG. 7, the SRAM of each image processing module included in the image processing unit 102 is set to the RS mode in advance. Then, by the control of the CPU 101, the SRAM returns to the normal mode from the RS mode, and then makes a transition again into the RS mode.

First, a sequence to cause the SRAM in the RS mode to return to the normal mode is explained. The CPU 101 accesses the RS control unit 207 via the BUS 114 at the timing of the CPU access A 301 shown on the timing chart and sets the RS_mode_Reg, which is an RS mode setting register, not shown schematically, to RS mode DISABLE (normal mode). Then, the RS control unit 207 outputs the LOW signal indicating the normal mode as the P_RS_ring_in signal. The timing at which the CPU access A 301 occurs is the timing at which the software receives a job and determines to use the image processing unit 102 based on the contents of the job.

The P_RS_ring_in signal output from the RS control unit 207 is first input to the image processing module A 201 as the RS_Ain signal. Further, the P_RS_ring_in signal output from the RS control unit 207 is input to the image processing module B 202 as the RS_Bin signal delayed by a delay amount 701 generated by the buffer 605.

The P_RS_ring_in signal output from the RS control unit 207 is input to the image processing module C 203 as the RS_Cin signal further delayed by a delay amount generated by the buffer 606.

The P_RS_ring_in signal output from the RS control unit 207 is output as the P_RS_ring_out signal further delayed by a delay amount generated by the buffer 607 and input to the RS control unit 207. The state transition of each SRAM at the time of the RS signal being input varies depending on the operation mode that is set to each individual piece of image processing. This will be explained later in detail.

Subsequently, a sequence to cause the SRAM in the normal mode to make a transition into the RS mode is explained. The CPU 101 accesses the RS control unit 207 via the BUS 114 at the timing of the CPU access B 302 shown on the timing chart and sets the RS_mode_Reg to RS mode ENABLE (RS mode). The timing at which the CPU 101 sets RS mode ENABLE to the RS_mode_Reg is the time at which the software detects the completion of the job and the software determines that the use of the image processing unit 102 is completed. In response to the CPU 101 setting RS mode ENABLE to the RS_mode_Reg, the RS control unit 207 outputs a signal indicating the RS mode as the P_RS_ring_in signal.

The P_RS_ring_in signal output from the RS control unit 207 is input to the image processing module A 201 as the RS_Ain signal. The P_RS_ring_in signal output from the RS control unit 207 is input to the image processing module B 202 as the RS_Bin signal delayed by a delay amount generated by the buffer 605. The P_RS_ring_in signal output from the RS control unit 207 is input to the image processing module C 203 as the RS_Cin signal further delayed by a delay mount generated by the buffer 606. The P_RS_ring_in signal output from the RS control unit 207 is output as the P_RS_ring_out signal further delayed by a delay amount generated by the buffer 607 and input to the RS control unit 207. The state transition of each SRAM at the time of the RS signal being input varies depending on the operation mode that is set to each individual piece of image processing. This will be described later in detail.

Figure 8:
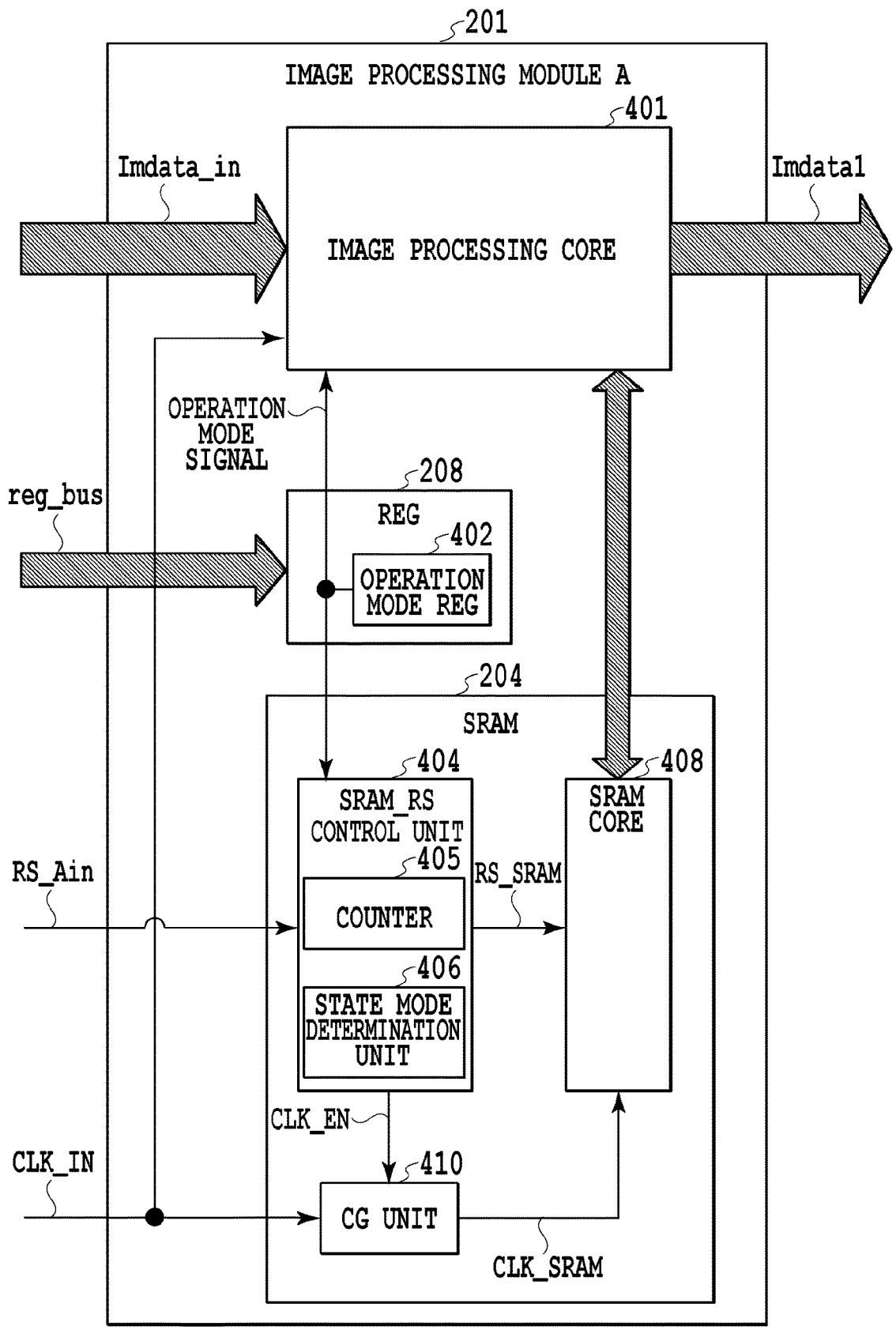
FIG. 8 is a block diagram showing an internal configuration of an image processing module of the second embodiment.

Subsequently, by using the image processing module A 201 making up the image processing unit 102 in the second embodiment as an example, the internal configuration thereof is explained by using FIG. 8. In FIG. 8, the RS_Ain signal is input to the SRAM_RS control unit 404. Further, different from FIG. 4, the RS_A signal is not output from the SRAM_RS control unit 404. The reason is that, in the present embodiment, the delay amount of the RS signal is generated by the buffer 605, the buffer 606, and the buffer 607 arranged on the transmission path of the P_RS_ring_in signal already explained. The other configurations are the same as those in FIG. 4, and therefore, explanation is omitted.

Figure 9A:
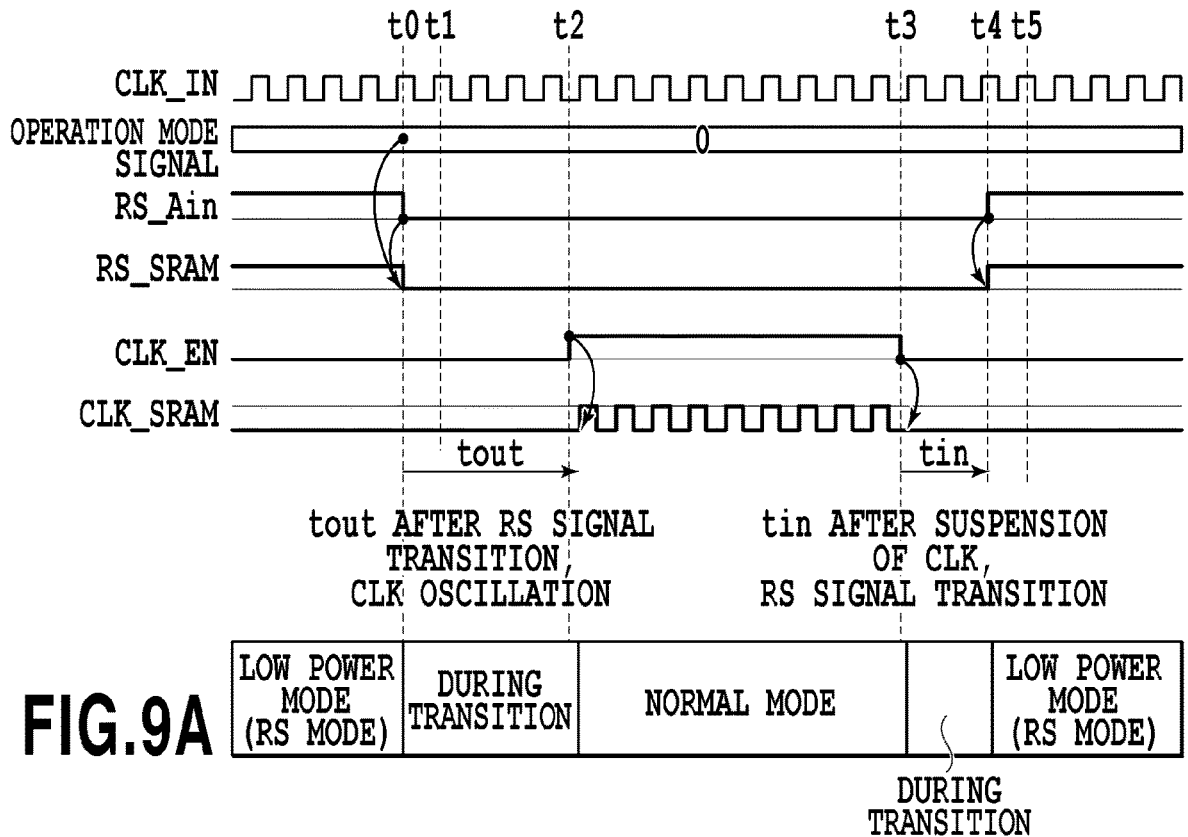
FIG. 9A and FIG. 9B are each a timing chart showing control of an RS mode of an SRAM of the second embodiment.
Figure 9B:
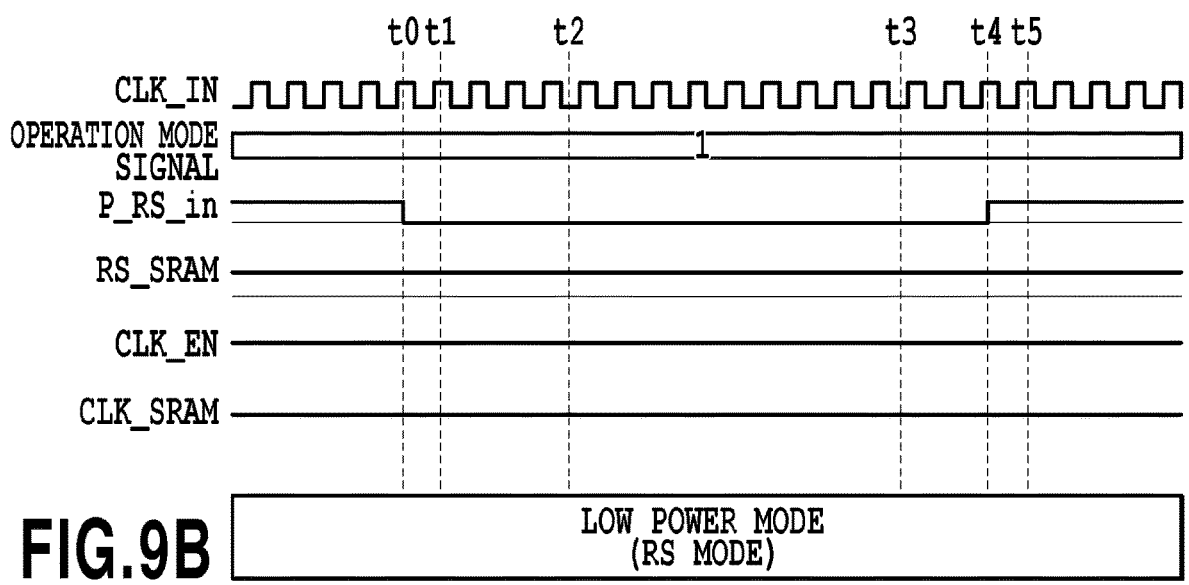

Next, by using FIGS. 9A and 9B, the control timing of the RS mode of the SRAM in the second embodiment is explained. That is, the control is explained in which the SRAM_RS control unit 404 controls the RS_SRAM signal based on the setting value of the operation mode REG 402 and controls whether or not to change the state mode of the SRAM core 408 in accordance with the input of the RS_Ain signal.

The timing charts shown in FIGS. 9A and 9B are more simplified than the timing charts shown in FIGS. 5A and 5B in the first embodiment, and therefore, only a difference is described. First, the difference between FIG. 9A and FIG. 5A is described. The difference between these two timing charts is whether or not the RS_A signal exists. In the second embodiment, the delay of the RS signal is implemented by the buffer 605, the buffer 606, and the buffer 607 arranged on the transmission path of the P_RS_ring_in signal as already explained. Because of this, inside the image processing module A 201, it is not necessary to pay attention to the delay amount of the arrival time of the RS signal, which is necessary for the SRAM that returns at the next timing of the SRAM core 408 included in the image processing module A 201. The P_RS_in signal in FIG. 5A and the RS_Ain signal in FIG. 9A are basically the same signal.

Next, the difference between FIG. 9B and FIG. 5B is described. The difference between these two timing charts is also whether or not the RS_A signal exists. The P_RS_in signal in FIG. 5B and the RS_Ain signal in FIG. 9B are basically the same signal. The timing of the other portions than the RS_A signal is the same as that in FIGS. 5A and 5B. That is, the delay amount of the RS signal is implemented by the buffer 605, the buffer 606, and the buffer 607 arranged on the transmission path of the P_RS_ring_in signal. Even in the case such as this, on a condition that the operation mode of the image processing module is set to the operation mode not including the SRAM access, it is made possible to keep the operation mode of the SRAM in the RS mode irrespective of the RS signal that is input. Consequently, it is made possible to reduce unnecessary operation power.

Third Embodiment

In the first and second embodiments, the SRAM_RS control unit 404 included in each image processing module determines whether or not to case the SRAM core to make a transition into the normal mode from the RS mode in accordance with the operation mode that is set to the image processing module. Then, it is explained that the SRAM_RS control unit 404 can control the supply of the RS signal to the SRAM core and the clock supply timing. In the present embodiment, a configuration is explained in which a plurality of image processing pipelines exists in the image processing unit 102 and they are selected and used in accordance with the operation mode. For example, a configuration is explained in which the RS signal is transmitted in a daisy chain in order to mitigate a rush current in a configuration in which the image processing module group that is used is branched between color image processing and monochrome image processing. In the present embodiment, an example is explained in which the same effect as that of the previously described embodiments can be obtained even in the case where each image processing module does not include the state mode determination unit 406 by including an operation path determination unit 1013 within the image processing unit 102.

Figure 10:
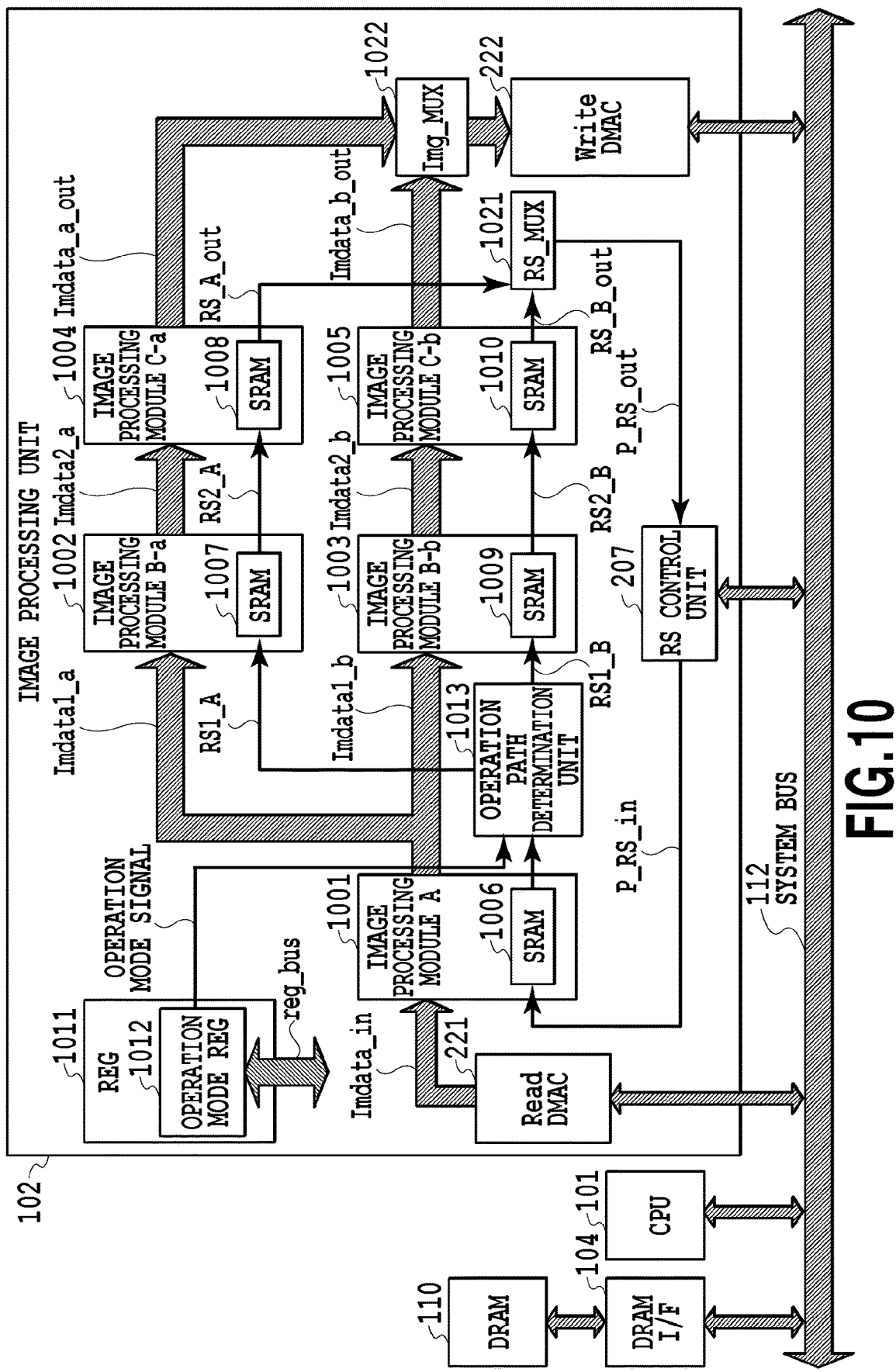
FIG. 10 is a block diagram showing an internal configuration of an image processing unit of a third embodiment.

FIG. 10 is a block diagram showing an internal configuration of the image processing unit 102 in the present embodiment. Explanation of the portions in common to those of the configuration of the first embodiment shown in FIG. 2 or those of the configuration of the second embodiment shown in FIG. 6 is omitted. In the image processing unit 102 in the present embodiment, an image processing module B and a subsequent image processing module included in the subsequent stages of an image processing module A 1001 are branched in parallel into two image processing modules, for example, in such a manner that the image processing module B is branched in parallel into an image processing module B-a 1002 and an image processing module B-b 1003 and so forth. Hereinafter, a path that advances from the image processing module A 1001 to the image processing module B-a 1002 and an image processing module C-a 1004 is called an image path a. On the other hand, a path that advances from the image processing module A 1001 to the image processing module B-b 1003 and an image processing module C-b 1005 is called an image path b. In the present embodiment, an example is explained in which one of the image path a and the image path b is selected depending on the operation mode of the image processing unit that is set to an operation mode REG 1012 of a REG 1011 included in the image processing unit 102. The operation mode that is set to the REG 1012 is selected depending on, for example, whether the image processing is the color image processing or the monochrome image processing.

Each of the image processing module A 1001, the image processing module B-a 1002, the image processing module C-a 1004, the image processing module B-b 1003, and the image processing module C-b 1005 included in the image processing unit 102 holds the SRAM inside thereof. Then, each has a configuration in which the operation mode of the SRAM is caused to make a transition in accordance with the P_RS_in signal that is input from the RS control unit 207.

Next, the operation path determination unit 1013 is explained. The operation path determination unit 1013 performs control so as to supply the RS signal to SRAMs included in the image path to be used by the operation mode of the image processing unit 102, which is set to the operation mode REG 1012. That is, in the case where the image path a is set to the operation mode REG 1012, a setting value indicating the image path a is input to the operation path determination unit 1013 through an operation mode signal. The operation path determination unit 1013 supplies the input P_RS_in signal to SRAMs (SRAM 1007 and SRAM 1008) included in the image path a as an RS 1_A signal based on the operation mode signal. Then, the operation path determination unit 1013 controls an RS 1_B signal so as to prevent the operation mode of SRAMs (SRAM 1009 and SRAM 1010) of the image path b from making a transition. On the other hand, in the case where the image path b is set to the operation mode REG 1012, the operation path determination unit 1013 supplies the input P_RS_in signal to the SRAMs included in the image path b as the RS 1_B signal. Then, the operation path determination unit 1013 controls the RS 1_A signal so as to prevent the operation mode of the SRAMs included in the image path a from making a transition. Here, it is preferable for the SRAM in the present embodiment not to hold the state mode determination unit 406 explained in the first embodiment and the second embodiment, but there occurs no problem even in the case where the SRAM holds the state mode determination unit 406. Further, there occurs no problem also in the case where the image processing that uses the state mode determination unit 406 and the image processing that does not use the state mode determination unit 406 exist mixedly.

Based on the determination of the operation path determination unit 1013 already explained, the input P_RS_in signal is output as it is as the RS 1_A signal and the RS 1_B signal, or a signal that holds the RS mode for the path determined not to operate by the operation path determination unit 1013 is output. In the present embodiment, the configuration is such that the RS signal is supplied to the two paths, but the number of paths is not limited to two and there occurs no problem even in the case where the number of paths to which the RS signal is supplied is increased in accordance with the number of image processing pipelines. Further, in the present embodiment, for simplification of explanation, the paths are described so as to operate exclusively to each other, but a configuration may be accepted in which a plurality of paths operates simultaneously. In this case, it is necessary to design the configuration by supposing in advance the connection method of the RS signal. Further, it may be also be possible to simultaneously perform the control by the state mode determination unit 406 within each SRAM explained in the first embodiment and the second embodiment.

An RS_MUX 1021 outputs the RS signal that passes through the image path that is set to the operation mode REG 1012 as the P_RS_out signal in conjunction with the operation path determination unit 1013. That is, in the case where the image path a is selected, the RS_MUX 1021 outputs the RS signal that has been output as an RS_A_out signal via an SRAM 1007 and an SRAM 1008 as the P_RS_out signal. On the other hand, in the case where the image path b is selected, the RS_MUX 1021 outputs the RS signal that has been output as an RS_B_out signal via an SRAM 1009 and an SRAM 1010 as the P_RS_out signal.

An Img_MUX 1022 is a block that outputs image data output from the image path that is set to the operation mode REG 1012 to Write DMAC as the final output image.

By adopting the configuration such as this, it is made possible to change the RS mode only for SRAMs included in the image path that is made use of without the need to include the state mode determination unit inside each SRAM which is held by the image processing module as explained in the first embodiment and the second embodiment.

Figure 11:
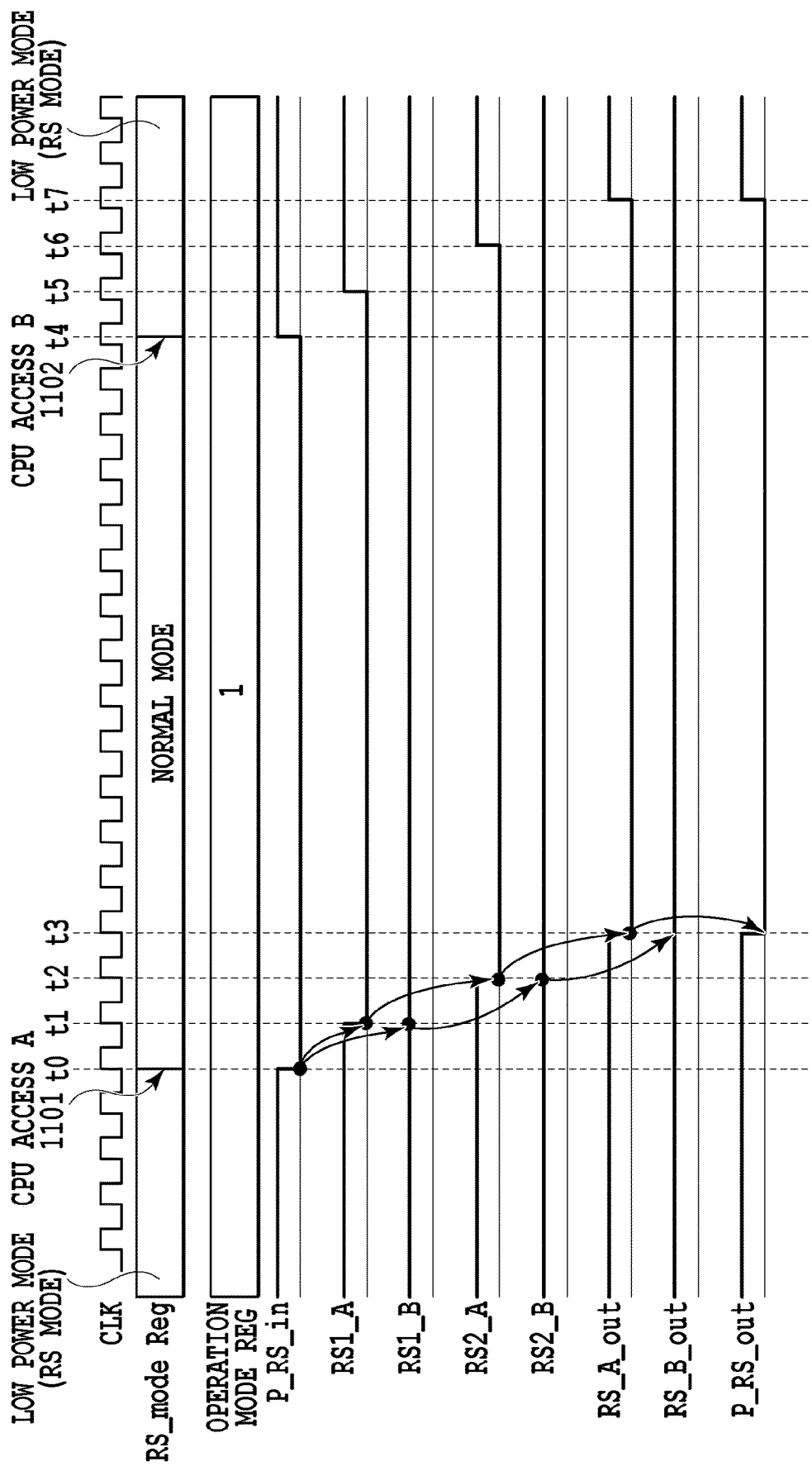
FIG. 11 is a timing chart of an RS signal in the image processing unit of the third embodiment.

In FIG. 11, the transition timing of the state mode of the SRAM of each image processing module in the present embodiment is shown. Here, explanation is given on the premise that making use of the image path a is set to the operation mode REG 1012. First, a sequence to return to the normal mode from the RS mode is explained.

At the time t0, CPU access A 1101 occurs. That is, the CPU 101 accesses the RS control unit 207 at timing of the CPU access A 1101 and sets the RS_mode_Reg, which is the RS mode setting register, not shown schematically, to DISABLE (normal mode). Then, the RS control unit 207 turns the P_RS_in signal to LOW indicating the normal mode and outputs the signal. The timing at which the CPU access A 1101 occurs is timing at which the software receives a job and determines to use the image processing unit 102 based on the contents of the job.

At the time t1, the signal output from the RS control unit 207 is input to the SRAM 1006, and then delayed by a certain amount and output to the operation path determination unit 1013.

Here, based on the premise described above, by the operation path determination unit 1013 monitoring the operation mode signal, it is determined that the image path a is made use of. Consequently, the operation path determination unit 1013 outputs the RS signal input from the SRAM 1006 as the RS 1_A signal. On the other hand, the operation path determination unit 1013 asserts the HIGH signal indicating the RS mode as the RS 1_B signal so as to prevent the SRAMs included in the image path b from making a transition into the normal mode from the RS mode.

The RS signal output to the image path a is input to the SRAM 1007 at the time t1, and then delayed by a certain amount and output from the SRAM 1007 as an RS 2_A signal at the time t2. Then, the RS 2_A signal input to the SRAM 1008 is delayed by a certain amount and output from the SRAM 1008 as the RS_A_out at the time t3.

On the other hand, the RS signal output to the image path b is input to the SRAM 1009 at the time t1, and then delayed by a certain amount and output from the SRAM 1009 as an RS 2_B signal at the time t2. Then, the RS 2_B signal input to the SRAM 1010 is delayed by a certain amount and output from the SRAM 1010 as the RS_B_out signal at the time t3. Here, the image path b does not make a transition from the RS mode, and therefore, all of the RS 1_B signal, the RS 2_B signal, and the RS_B_out signal remain HIGH, i.e., remain unchanged.

In accordance with that the image path a is set to the operation mode REG 1012, at the time t3, the RS_MUX 1021 outputs the RS_A_out signal of the RS_A_out signal and the RS_B_out signal that are input as the P_RS_out signal.

Subsequently, a sequence to cause the SRAM in the normal mode to make a transition into the RS mode is explained. At the time t4, the CPU 101 accesses the RS control unit 207 via the BUS 114 at timing of CPU access B 1102 shown on the timing chart and sets RS mode ENABLE (RS mode) to the RS_mode_Reg. The timing at which the CPU 101 sets RS mode ENABLE to the RS_mode_Reg is the time at which the software detects the completion of the job and the software determines that the use of the image processing unit 102 is completed. In the case where the CPU 101 sets the RS_mode_Reg to RS mode ENABLE, the RS control unit 207 outputs a signal indicating the RS mode as the P_RS_in signal.

At the time t5, the signal output from the RS control unit 207 is input to the SRAM 1006, and then output to the operation path determination unit 1013 with a certain amount of delay.

Here, by the operation path determination unit 1013 monitoring the operation mode signal based on the above-described premise, it is determined that the image path a is being made use of. Consequently, the operation path determination unit 1013 outputs the input RS signal from the SRAM 1006 as the RS 1_A signal. On the other hand, the operation path determination unit 1013 asserts the HIGH signal indicating the RS mode as the RS 1_B signal so as to prevent the SRAMs included in the image path b from making a transition into the normal mode from the RS mode.

The RS signal output to the image path a is input to the SRAM 100 at the time t5, and then delayed by a certain amount and output from the SRAM 1007 as the RS 2_A signal at a time t6. Then, the RS 2_A signal input to the SRAM 1008 is delayed by a certain amount and output from the SRAM 1008 as the RS_A_out signal at a time t7.

The RS signal output to the image path b is input to the SRAM 1009 at the time t5, and then delayed by a certain amount and output from the SRAM 1009 as the RS 2_B signal at the time t6. Then, the RS 2_B signal input to the SRAM 1010 is delayed by a certain amount and output from the SRAM 1010 as the RS_B_out signal at the time t7. Here, the image path b does not make a transition from the RS mode, and therefore, all of the RS 1_B signal, the RS 2_B signal, and the RS_B_out signal remain HIGH, i.e., remain unchanged.

In accordance with that the image path a is set to the operation mode REG 1012, at the time t7, the RS_MUX 1021 outputs the RS_A_out signal of the RS_A_out signal and the RS_B_out signal that are input as the P_RS_out signal.

Here, the internal configuration of each image processing module in the present embodiment is the same as the internal configuration of the first embodiment shown in FIG. 4 or the internal configuration of the second embodiment shown in FIG. 8. However, the internal configuration of the present embodiment differs from those of the first and second embodiments in that the state mode determination unit 406 is not included. That is, each image processing module in the present embodiment inputs the RS signal that is input to the SRAM_RS control unit 404 to the SRAM core as the RS_SRAM signal without performing the determination of the state mode determination unit 406.

Further, the present embodiment is explained for the case where the SRAM held by each image processing module controls the delay, but it may also be possible to design a configuration in which the delay amount is controlled by the delay buffer as explained in the second embodiment and the delay amount is input to the SRAM held by each image processing module.

Furthermore, the present embodiment is explained for the case where the image path a is set to the operation mode REG 1012, but of course it is possible to perform the embodiment even in the case where the image path b is set. At this time, it is sufficient for the operation path determination unit to perform control so that the RS signal output from the SRAM 1006 is output as the RS_B signal and on the other hand, the HIGH signal is output as the RS_A signal so as to keep the RS mode. Further, it is sufficient for the RS_MUX 1021 to perform control so that the RS_B_out signal is output as the P_RS_out signal.

As described above, in the present embodiment, in the configuration in which a plurality of image processing pipelines exists in the image processing unit 102 and they are selected and used in accordance with the operation mode, the operation path determination unit 1013 is included. Due to this, even in the case where each image processing module does not hold the state mode determination unit 406, which is held as explained in the first embodiment and the second embodiment, the same effect as that explained in the first and second embodiments is obtained.

Other Embodiments

In the above-described embodiments, as the information processing apparatus of the present invention, the MFP is explained, but the information processing apparatus may also be a personal computer, a server, etc. Further, in the above-described embodiments, explanation is given by taking the example of the case where the image processing module is used as the function module, but the example is not limited to this. It is possible to apply any configuration in which a memory is included in a predetermined function module in any of the embodiments.

As the storage medium for supplying program codes, it is possible to use, for example, a flexible disc, a hard disc, an optical disc, a magnet-optical disc, a CD-ROM, a CD-R, a magnetic tape, a nonvolatile memory card, a ROM, etc.

Further, the case is not limited to the case where the functions of the embodiments described previously are implemented by the computer executing the read program codes. For example, the case is also included where an OS (Operating System) or the like running on a computer performs part or all of the actual processing based on instructions of the program codes and the functions of the embodiments described previously are implemented by the processing thereof.

Furthermore, the case is also included where the functions of the embodiments described previously are implemented after the program codes read from a storage medium are written to a memory included in a function extension board inserted into a computer or in a function extension unit connected to a computer. That is, the case is also included where after the program codes are written to the memory, a CPU or the like included in the function extension board or the function extension unit performs part or all of the actual processing based on the instructions of the program codes and the functions are implemented by the processing thereof.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is made possible to suppress occurrence of a density gap within the same drawing object caused by smoothing processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-019033, filed Feb. 3, 2016, which is hereby incorporated by reference wherein in its entirety.

What is claimed is:

1. A control apparatus comprising:
a first memory circuit that stores data, and is configured to shift from a second state to a first state according to a first predetermined signal, wherein power consumption of the second state is lower than that of the first state;
a first processing circuit operable in a first operation mode and a second operation mode, wherein in the first operation mode the first processing circuit is configured to perform a first predetermined processing for input data, to access the first memory circuit, and to output the processed input data, and wherein in the second operation mode the first processing circuit is configured to output the input data without accessing the first memory circuit;
a first storage circuit that stores a value corresponding to the operation mode of the first processing circuit; and
a first output circuit that, based on a value corresponding to the first operation mode of the first processing circuit stored in the first storage circuit, outputs the first predetermined signal to the first memory circuit, wherein the first memory circuit shifts from the second state to the first state according to the first predetermined signal from the output module first output circuit;
a second memory circuit that stores data, and is configured to shift from the second state to the first state according to a second predetermined signal;
a second processing circuit operable in a first operation mode and a second operation mode, wherein in the first operation mode the second processing circuit is configured to perform a second predetermined processing for input data from the first processing circuit, to access the second memory circuit, and to output the processed input data, and wherein in the second operation mode the second processing circuit is configured to output the input data without accessing the second memory circuit;
a second storage circuit that stores a value corresponding to the operation mode of the second processing circuit; and
a second output circuit that, based on a value corresponding to the first operation mode of the second processing circuit stored in the second storage circuit, outputs the second predetermined signal to the second memory circuit, wherein the second memory circuit shifts from the second state to the first state according to the second predetermined signal from the second output circuit, wherein
the first processing circuit outputs the processed input data to the second processing circuit in the first operation mode, and outputs the input data without performing the predetermined processing to the second processing circuit in the second operation mode.

2. The control apparatus according to claim 1, wherein the first output circuit outputs a timing signal to the second output circuit, wherein the second output circuit, based on the value stored in the second storage circuit, outputs the second predetermined signal to the second memory circuit when the timing signal is input.

3. The control apparatus according to claim 2, wherein the second processing circuit performs the second predetermined processing different from the first predetermined processing that the first processing circuit performs to the input data.

4. The control apparatus according to claim 2, wherein the first output circuit outputs the timing signal to the second output circuit after an output of the first predetermined signal to the first memory circuit.

5. The control apparatus according to claim 1, further comprising:
a clock gating circuit that gates a clock signal to the first memory circuit,
wherein the first output circuit outputs a clock enable signal to the clock gating circuit after an output of the first predetermined signal.

6. The control apparatus according to claim 1, wherein the second state is a state where supply of power to peripheral circuits except for a memory cell array included in the first memory circuit is stopped, and the first state is a state where power is supplied to the memory cell array and the peripheral circuits.

7. The control apparatus according to claim 6, wherein the first memory circuit is a SRAM (Static Random Access Memory).

8. The control apparatus according to claim 1, wherein the first processing circuit is a circuit that, by using the data stored in the first memory circuit, performs image processing for image data that is input.

9. The control apparatus according to claim 1, further comprising:
a printing device configured to print an image.

10. The control apparatus according to claim 1, wherein the first state is a state where the data can be read from memory cell arrays of the first memory circuit, and the second state is a state where the data cannot be read from the memory cell arrays of the first memory circuit.

11. The control apparatus according to claim 1, wherein the data stored in the first memory circuit is at least one of a parameter that the first processing circuit uses for processing or the input data that is input to the first processing circuit.

* * * * *